United States Patent
Colson

[15] 3,635,565
[45] Jan. 18, 1972

[54] LASER VERTICAL COLLIMATOR

[72] Inventor: George P. Colson, Sonoma, Calif.
[73] Assignee: Engineering Field Services, San Rafael, Calif.
[22] Filed: Feb. 16, 1970
[21] Appl. No.: 11,377

[52] U.S. Cl. .................................356/153, 33/46, 356/172
[51] Int. Cl. .......................................................G01b 11/27
[58] Field of Search ...............33/46, 73, 206, 215; 356/138, 356/153, 172; 240/78

[56] References Cited

UNITED STATES PATENTS

| | | | |
|---|---|---|---|
| 928,477 | 7/1909 | Sloggett | 33/46 |
| 1,999,201 | 4/1935 | Nichols | 356/153 |
| 2,517,295 | 8/1950 | Esher | 33/46 |
| 3,130,495 | 4/1964 | Schulte | 33/1 H |
| 3,324,758 | 6/1967 | Rogers, Jr. | 356/172 |
| 3,471,234 | 10/1969 | Studebaker | 356/138 |
| 3,475,101 | 10/1969 | Jeffrey, Sr. | 33/73 R |
| 3,505,739 | 4/1970 | Abrams | 33/46.2 |
| 3,535,525 | 10/1970 | Minkowitz | 356/172 |

Primary Examiner—Ronald L. Wibert
Assistant Examiner—J. Rothenberg
Attorney—Julian Caplan

[57] ABSTRACT

To establish as a plumb reference line for construction of buildings or shafts a laser beam is used. A laser source is mounted in a tube, the upper end of the tube is supported so that the weight of the tube and laser source makes the tube assume a vertical position. The support may be mounted on a tripod or side support. For shafts, the laser beam is directed downward. For buildings, the source may be reversed in the tube to be directed upward.

7 Claims, 5 Drawing Figures

INVENTOR.
GEORGE P. COLSON

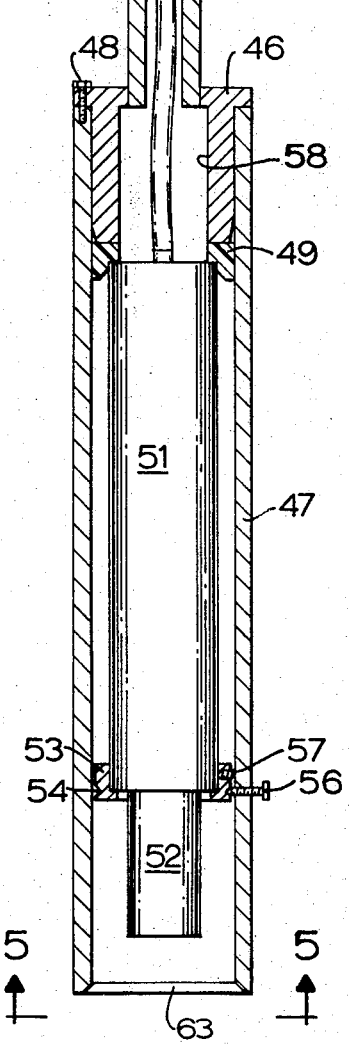
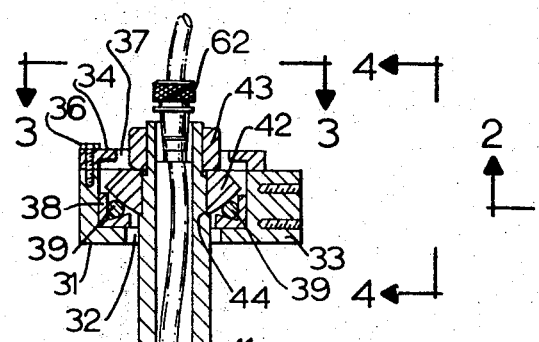
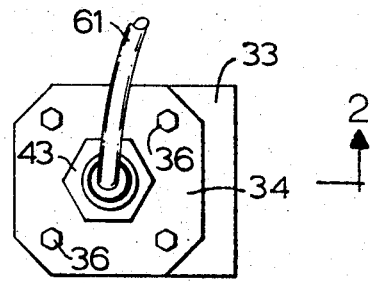
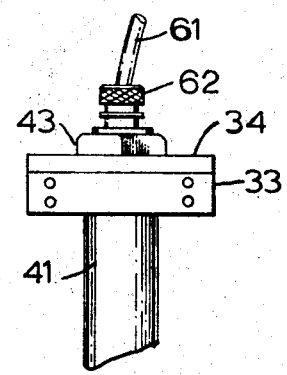
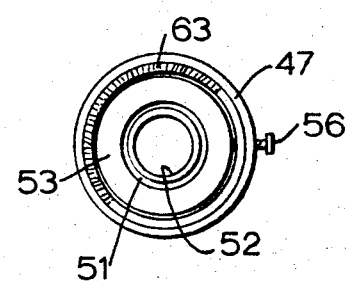

LASER VERTICAL COLLIMATOR

This invention relates to a new and improved laser vertical collimator. The device may be used as a means of providing a plumb reference line for construction or alignment of high buildings or deep shafts. A laser beam is generated by the device, as hereinafter described, which maintains a vertical alignment. In shafts or where there is not too much outside light, a simple visual target may be used. However, where outside light is a problem, a sensor, which is sensitive to the laser beam, may be used.

One use of the invention is as a survey instrument to transfer points from the surface to a shaft for mining or tunneling operations. Where such an installation is required, the precision required demands that a sensor arrangement be used.

A particular feature and advantage of the invention is the fact that a tube encasing the laser source is provided, set to be mounted in a manner so that its weight plus the weight of the laser source causes the laser source to assume a vertical position. The laser source is so mounted within the tube so it can be directed out either end (i.e., either downward or upward) and thus the same source can be used for either a vertical plumb line extending either downward or upward.

Other objects of the present invention will become apparent upon reading the following specification and referring to the accompanying drawings in which similar characters of reference represent corresponding parts in each of the several views.

In the drawings:

FIG. 2 is an enlarged, vertical, sectional view through the mounting for the laser source.

FIG. 3 is a top plan as viewed taken substantially along the line 3—3 of FIG. 2.

FIG. 4 is a fragmentary side elevation viewed substantially along the line 4—4 of FIG. 2.

FIG. 5 is a bottom plan as viewed substantially along the line 5—5 of FIG. 2.

Figure 1:
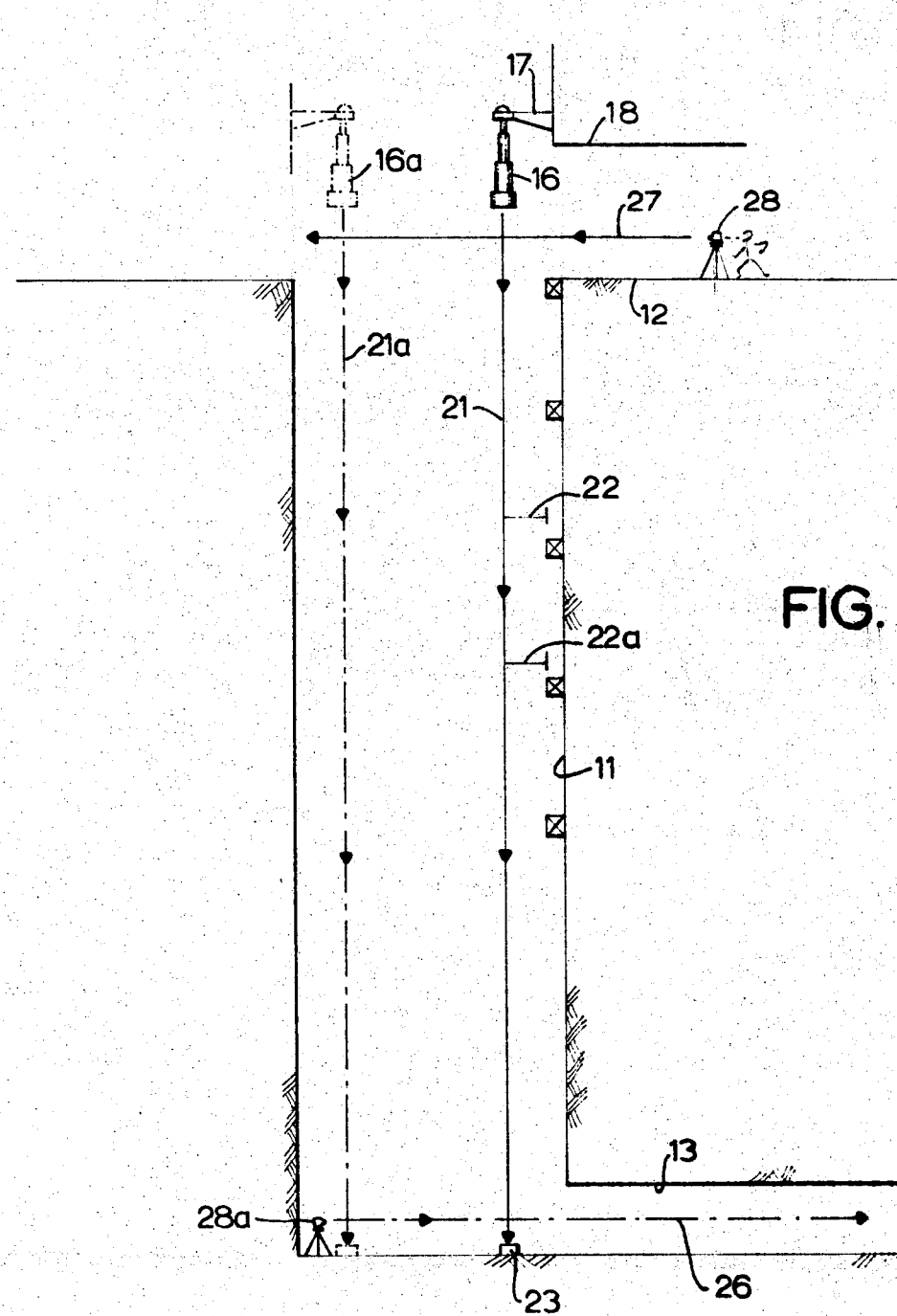
FIG. 1 is a schematic view showing the invention adapted in the construction of a mining shaft.

Referring to FIG. 1, a vertical shaft 11 is constructed below the surface 12. It is assumed that one or more horizontal offshoot tunnels 13 are constructed from shaft 11. The present invention can be used for various purposes in connection with such a mining operation. However, it is further understood that the device may be used in the construction of high buildings as will readily be apparent to one skilled in this art. In the installation of FIG. 1, the laser beam support 16 is supported from a bracket 17 which is here shown attached to a permanent structure 18. It will be understood that bracket 17 may be attached to a tripod or other convenient support. The beam 21 directed from the support 16 is vertical, as is ensured by the construction hereinafter described, and hence the line 21 is vertical. With such a line established, various offsets such as the offsets 22, 22a may be measured. Thus, either visually or by use of a target which is interposed below the beam 21 a point is established on the line 21 and a measurement such as 22, 22a may be made from such point to a position on the shaft 11. At the bottom of the shaft 11 a sensor 23 may be installed if desired. Such a sensor 23 is eliminated when a laser beam impinges thereon, or the sensor may include a photocell, all is well understood in the laser art.

FIG. 1 also illustrates how the device may be used to establish a below level line 26 which in parallel to a surface line 27. In this use of the device, a second beam support 16a, similar to support 16, is installed in line with support 16. A transit 28 or other means obtains a line of sight which is horizontal and which intersects the beam 21 and the beam 21a from source 16a. At the bottom of shaft 11 a second transit or level 28a is installed and this instrument is used to establish the line 26 parallel to line 27. As will readily occur to one skilled in this art, the lines 26 and 27 need not necessarily be parallel vertically but may be at various angles as in accordance with conventional surveying practice.

Turning now to FIG. 2, a mount 31 is provided which is hollow and open at the top and has an enlarged hole 32 at the bottom. A lateral offset 33 of mount 31 may be attached to bracket 17 by bolts or other means. An annular cover 34 is held on the top of mount 31 by screws 36, the cover 34 having an enlarged opening 37 therein in registry with opening 32. In the bottom of mount 31 is a bearing support 38 which is generally L-shaped in cross section and receives a plurality of steel balls 39 similar to ball bearings.

The laser source support has a lightweight upper tube 41 provided at its upper end with a spheroidal bearing member 42 which fits on top of the balls 39. A nut 43 holds bearing 42 against a shoulder 44 formed near the upper end of tube 41. When the nut is removed, the tube 41 and bearing 42 may be lifted.

Below tube 41 is a connector 46 which receives the upper end of a heavy tube 47. Screws 48 hold the members 46 and 47 together and a micarta, shoulder-forming annular member 49 is installed at the lower end of connector 46.

A cylindrical laser source 51 is used and its lower end has an optical element 52 of lesser diameter. The ring 53 is installed on the lower end of member 51 having a groove 54 therein which receives the inner ends of setscrews 56 which are threaded into the walls of tube 57. Ring 53 is held in place on member 51 by setscrews 57. The dimension of the cavity 58 inside connector 46 is sufficient to receive the optical mounting 52 of laser 51.

In the use of the device, by reason of the bearing 42 resting on the balls 39 and the heavy weight of the laser source 51 and tube 47, tube 47 assumes a vertical position. The electrical wiring 61 for the source 51 is installed through the top of tube 41 and held in central position by a connector 62. The optical section 52 being downmost, the laser beam is emitted through the open bottom 63 of tube 47.

In order to reverse the direction of the laser beam, the connector 62 is separated to disconnect the wiring 61 and the screw 56 is loosened. This permits the source 51 to be removed through the bottom of tube 47 and then reversed in position so that the optical housing 52 fits inside cavity 68 and the optical source 51 again is within the tube 47. In this position, the ring 53 is installed on the bottom of the casing 51 and the cord 61 extends out through the bottom 63 of tube 47. The laser source is directed up through the tube 41. Here again the weight of the device keeps the tubes 41 and 47 vertical and hence the source 51 is positioned to emit a vertical beam.

Tube 41 may be rotated to adjust the laser source within casing 51 to precisely vertical position. As a practical matter, it is impossible to permanently hold the laser beam perfectly parallel to tubes 41 and 47. By rotating the tube and using a sensor at position 23 a series of observations may be taken which form a "circle of error" (as well understood in the surveying art). Thus extremely precise collimation may be obtained for survey purposes.

Although the foregoing invention has been described in some detail by way of illustration and example for purposes of clarity of understanding, it is understood that certain changes and modifications may be practiced within the spirit of the invention and scope of the appended claims.

What is claimed is:

1. Apparatus for establishing a plumb line comprising an enlarged apertured support adapted for attachment to a stationary object, an annular horizontal first bearing member in said support, an elongated substantially vertical tube having a second bearing member adjacent its upper end shaped to rest upon said first bearing member in a relatively frictionless relation whereby the weight of said tube causes said tube to assume a vertical direction, a laser source having a casing fitting within said tube with the axis of said source parallel to said tube to emit a vertical laser beam through a first end of said tube, and an electric cord for said source extending through a second end of said tube, said tube rotatable relative to said first bearing member about a substantially vertical axis of rotation to permit formation of a circle of error of the laser beam for precise collimation of said beam.

2. Apparatus according to claim 1 in which one of said bearing members includes a plurality of ball bearings.

3. Apparatus according to claim 1 in which said tube carries mounting means detachably engaging said casing, said casing being reversible end for end in said tube and said mounting means engaging said casing in either of its positions.

4. Apparatus according to claim 3 in which said mounting means comprises an annular upper mounting ring inside said tube, said casing having a first end and a shoulder adjacent its second end, both said first end and said shoulder adapted to fit against said upper mounting ring to restrain the upper end of said casing centrally of said tube, a second ring fitting on said casing, and means on said tube remote from said upper mounting ring engageable with said second ring to restrain the lower end of said casing centrally of said tube.

5. Apparatus according to claim 4 in which said casing has a smaller diameter portion at its first end above said shoulder and a cord at its second end, the interior of said tube above said upper mounting ring dimensioned to receive said smaller diameter portion, said cord electrically connected to said laser source to energize said laser source.

6. A method of surveying comprising vertically mounting a laser beam source resting on a horizontal bearing to permit free angular movement of said source relative to said bearing about two perpendicular horizontal axes, whereby the weight of said source causes the source to assume a vertical position and the laser beam emitted to be vertical, energizing said source to produce a vertical laser beam and measuring an offset from said beam by illuminating a target from said beam and measuring distance from said target, said source also mounted rotatable relative to said bearing to permit forming a circle of error on a sensor illuminated by said beam to precisely collimate said beam, said source being rotated to illuminate a sensor below said source to establish a true vertical line between said source and said sensor by forming a circle of error at said sensor before measuring said offset.

7. A method of surveying comprising establishing a first line at a first elevation, vertically mounting a first laser beam source resting on a first horizontal bearing to permit free angular movement of said first source relative to said first bearing about two perpendicular horizontal axes whereby the weight of said first source causes said first source to assume a vertical position and the first laser beam emitted therefrom to be vertical and to intersect said first line, vertically mounting a second laser beam source resting on a second horizontal bearing to permit free angular movement of said second source relative to said second bearing about two perpendicular horizontal axes whereby the weight of said second source causes said second source to assume a vertical position and the second laser beam emitted therefrom to be vertical and to intersect said first line, energizing said first and second sources to produce vertical first and second beams, respectively, locating a first target illumination by said first beam at a second elevation, locating a second target illuminated by said second beam at said second elevation, and establishing a second line at said second elevation by sighting along both said targets, said second line parallel to said first line.

* * * * *